United States Patent [19]
Walters

[11] Patent Number: 5,850,903
[45] Date of Patent: Dec. 22, 1998

[54] CONVEYOR BELT SUPPORT

[75] Inventor: Brian William Walters, Prudhoe, England

[73] Assignee: Huwood International Limited, Gateshead, England

[21] Appl. No.: 700,464
[22] PCT Filed: Mar. 6, 1995
[86] PCT No.: PCT/GB95/00475
    § 371 Date: Sep. 5, 1996
    § 102(e) Date: Sep. 5, 1996
[87] PCT Pub. No.: WO95/23751
    PCT Pub. Date: Sep. 8, 1995

[30]    Foreign Application Priority Data

Mar. 5, 1994 [GB]  United Kingdom .............. 9404297

[51] Int. Cl.⁶ ............................................. B65G 15/26
[52] U.S. Cl. ..................................... 198/588; 198/812
[58] Field of Search .................................. 198/588, 594, 198/812

[56]           References Cited

U.S. PATENT DOCUMENTS

| | | | |
|---|---|---|---|
| 2,576,217 | 11/1951 | Eggleston | 198/812 X |
| 2,863,553 | 12/1958 | Nordquist | 198/812 X |
| 3,664,488 | 5/1972 | Florian et al. | 198/812 X |
| 4,643,299 | 2/1987 | Calundan | 198/812 |
| 4,771,880 | 9/1988 | Mraz | 198/812 |
| 4,860,878 | 8/1989 | Mraz et al. | 198/812 X |
| 4,890,720 | 1/1990 | Brais | 198/592 |
| 5,181,600 | 1/1993 | Chappell et al. | 198/812 |
| 5,366,068 | 11/1994 | Hall et al. | 198/812 |
| 5,490,592 | 2/1996 | Best et al. | 198/812 |
| 5,595,283 | 1/1997 | Whetsel | 198/812 |

FOREIGN PATENT DOCUMENTS

| | | |
|---|---|---|
| 28376/92 | 11/1992 | Australia . |
| 0 274 054 | 7/1988 | European Pat. Off. . |
| 1216173 | 4/1960 | France . |
| 1471236 | 3/1967 | France . |
| 2 600 990 | 11/1984 | France . |
| 2 140 369 | 11/1984 | United Kingdom . |
| 2 200 613 | 8/1988 | United Kingdom . |
| 90/08717 | 8/1990 | WIPO . |

Primary Examiner—James R. Bidwell
Attorney, Agent, or Firm—Bell Seltzer Intellectual Property Law Group of Alston & Bird LLP

[57]            ABSTRACT

The present invention relates to extensible endless conveyor belt support structures and systems. A support structure has vertical support members (8) connected by V-shaped arrangements of pivotally connected (17, 19) link members (7, 9). By mounting at least the upper belt run rollers (4) on the vertical supports (8) the load can be more effectively supported whilst providing a relatively high ratio of extended to contracted length. By using telescopically extendable (14, 15) vertical supports (8), any increase in overall height of the support structure upon contraction thereof is minimized or avoided. By also having detachable lower belt run rollers (23) the support structure can be inserted into an endless conveyor belt installation without dismantling or even stopping running thereof. The invention also provides systems including setting devices for holding the support structures in their contracted form and deploying and collecting them into and from their extended conditions. Preferably the setting device includes a retractor means for drawing in the support structure during collection thereof.

17 Claims, 3 Drawing Sheets

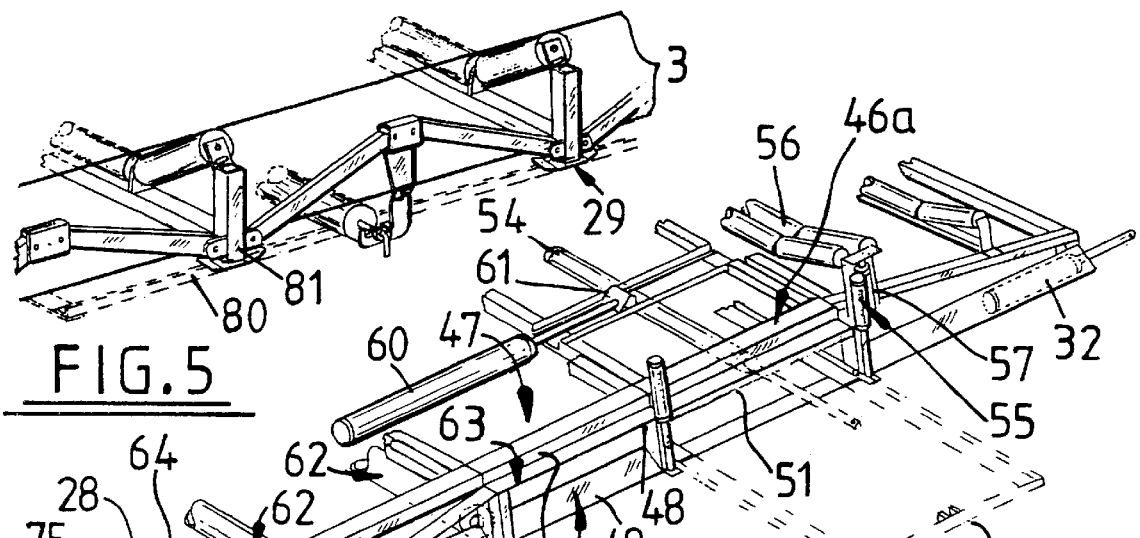
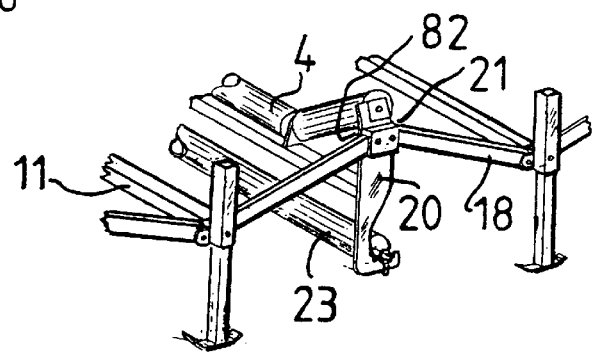
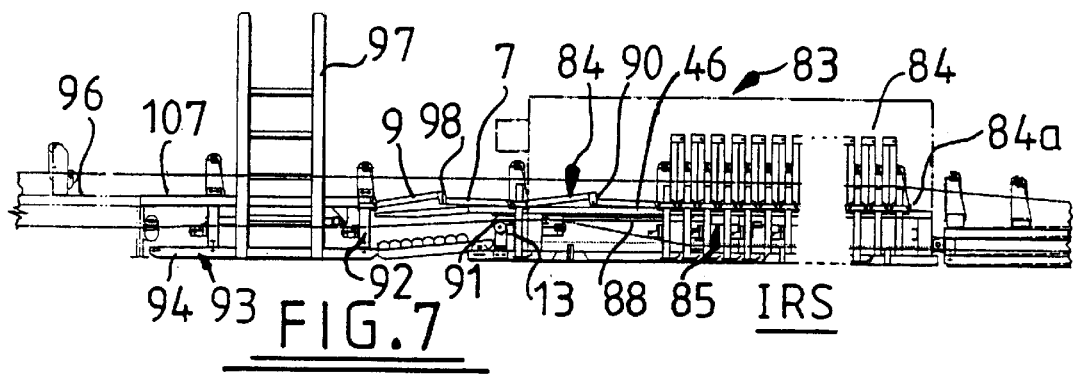

CONVEYOR BELT SUPPORT

The present invention relates to supports for endlessconveyor belts, and more particularly to a longitudinally extendable and retractable endless conveyor belt support structure and a setting device suitable for use in conjunction with a remotely sited belt storage device.

In many endless conveyor belt applications the belt loading point adjacent to the return end of the conveyor advances and retreats more or less frequently thereby requiring that the conveyor length should be extended or retracted. Erection and dismantling of a conventional conveyor belt support structure can be very time-consuming and labour-intensive resulting in significant down-time of the conveyor and hence loss of production.

Recently there has been proposed in WO90/08717 and U.S. Pat. No. 4,860,878 a telescopically extendable support structure made up of interlinked A-frames which close up and open out in generally concertina-like manner. The upper and lower belt run support rollers are mounted generally centrally of the limbs of the A-frames so that the structure has a relatively large overall height even in its deployed condition and the height is substantially further increased in the contracted condition of the support structure when the support structure is being moved into place or positioned awaiting deployment. This is particularly undesirable in the case of underground mining and tunnelling applications where overhead clearance and effective widths are often very restricted. In addition, whilst these systems may permit a degree of longitudinal extension or contraction of the support structure, a degree of assembly is generally necessary for insertion into an existing endless conveyor belt. Alternatively the endless belt itself may require dismantling should a transporting device be deployed loaded with fully assembled belt supports for insertion therein. A corresponding degree of dismantling is necessary when removing the contracted support structure from the conveying system, thereby still requiring a significant amount of labour as well as interrupting operation of the conveyor belt especially where dismantling thereof is required.

A further significant disadvantage of the use of an A-frame structure is that the weight of the belt and material being carried thereon is carried on inclined support members which results in bending stresses being applied to them and the need for suitably strong chains or other secondary links for preventing splaying out of the inclined supports. This also results in longitudinal extension of the support structure being substantially restricted in order to contain such problems.

It is an object of the present invention to avoid or minimize one or more of the abovementioned disadvantages.

The present invention provides an endless conveyor belt support structure which is longitudinally extendable between an extended condition for supporting the endless conveyor belt, and a contracted condition, which support structure comprises a plurality of pivotally interconnected support members at opposite sides of the support structure, at least some of said support members being substantially rigidly interconnected by crossmembers to corresponding support members at the opposite side of the support structure, at least some of said support members mounting upper belt run support roller means at an upper edge portion of the support structure and at least some of said support members mounting lower belt run support roller means, said support members being interconnected so as provide for longitudinal extension and contraction of said sides of the support structure in generally concertina-like manner, characterised in that said support structure comprises a plurality of generally vertically extending support members interconnected by generally V-shape arrangements of pivotally connected pairs of linked support members in which the V-shape opens out or closes up for extension or contraction of the support structure.

Preferably the generally vertically extending support members are telescopically extensible from a contracted form in the longitudinally contracted condition of the structure to an extended form in the longitudinally extended condition of the structure.

The present invention also provides an endless conveyor belt support structure which is longitudinally extendable between an extended condition for supporting the endless conveyor belt, and a contracted condition for insertion into and removal from an endless conveyor belt installation, which support structure comprises a plurality of pivotally interconnected support members at opposite sides of the support structure, at least some of said support members being substantially rigidly interconnected by crossmembers to corresponding support members at the opposite side of the support structure at an upper edge portion of the support structure, at least some of said support members mounting upper belt run support roller means at an upper edge portion of the support structure and at least some of said support members detachably mounting lower belt run support roller means, (preferably detachably) said support members being interconnected so as provide for longitudinal extension and contraction of said sides of the support structure in generally concertina-like manner, at least some of said support members being longitudinally extendable between a contracted form in the longitudinally contracted condition of the support structure, and an extended form in the longitudinally extended condition, so that the overall height of the support structure can be reduced in its longitudinally contracted form, whereby insertion and removal of the support structure may be effected substantially without dismantling of the conveyor belt or the support structure apart from detaching and replacement of said lower belt run support roller when detachable lower belt run support rollers are used.

It will be appreciated that various forms of support in this form of support structure of the present invention. In one preferred form there is provided a plurality of generally vertically extending support members interconnected by generally V-shaped arrangement of pivotally connected pairs of link support members in which the V-shape opens out or closes up for extension or contraction of the support structure, the vertically extending support members being longitudinally extensible e.g. telescopically extensible. In the fully extended form of the support structure the V-shape can be opened out into a substantially straight form though preferably the included angle at the apex is limited to slightly less than 180°, preferably an angle of from 140° to 179°, most preferably from 150° to 178°, e.g. 176°, in order to facilitate collapsing of the V-shape during retraction. In contrast A-frame type structures such as those used in U.S. Pat. No. 4,860,878 and WO 90/08717 have substantially restricted opening angles in order to be able to support the weight of the loaded conveyor belt and carry it at a suitable height above the ground.

Conveniently upper edge portions of substantially all the vertically extending support members are interconnected by the cross-members. Advantageously the cross-members are used to support belt support roller means.

The present invention also provides an endless conveyor belt support structure which is longitudinally extendable between an extended condition for supporting the endless conveyor belt, and a contracted condition for insertion into and removal from an endless conveyor belt installation, which support structure comprises a plurality of pivotally interconnected support members at opposite sides of the support structure, at least some of said support members being substantially rigidly interconnected by crossmembers to corresponding support members at the opposite side of the support structure, at least some of said support members mounting upper belt run support roller means at an upper edge portion of the support structure and at least some of said support members detachably mounting lower belt run support roller means, said support members being interconnected so as provide for longitudinal extension and contraction of said sides of the support structure in generally concertina-like manner, and comprising a plurality of generally vertically extending support members interconnected by generally (preferably inverted) V-shape arrangements of pivotally connected pairs of link support members in which the V-shape opens out or closes up for extension or contraction of the support structure.

With the cross-members mounted at the upper edge portion of the support structure and the lower belt run roller means detachable, the support structure can be inserted and removed to and from a laterally adjacent position between upper and lower belt run portions. Conveniently the cross-members are used as part of the mounting means for upper belt run support rollers, especially where these are of the so-called "transom" type. It is nevertheless also possible to use separate mounting means with, for example, the support belt run support rollers suspended from support members at opposite sides of the support structure. The upper and/or lower belt run portions can, if necessary be displaced vertically to facilitate insertion and removal of the support structure. It is however a particular advantage of the present invention that insertion and removal can be effected without the need for actually dismantling the belt, and in a particularly preferred aspect, without even having to interrupt operation of the belt conveyor.

In a further respect the present invention provides a setting device suitable for use in insertion and/or removal of a conveyor belt support cassette comprising a length of a support structure of the invention in/from an endless conveyor belt system, said setting device comprising an elongate platform means having:

a cassette receiving and/or ejecting section; and a cassette installation and/or recovery section, said platform means being formed and arranged for supporting, in use, a said cassette between the upper and lower belt runs, said receiving and/or ejecting section having laterally displacable cassette transfer means formed and arranged for transferring a cassette in a longitudinally contracted form between a setting device loading/unloading position adjacent one side of the setting device, and a position between the upper and lower belt runs, and bringing the cassette to/from a position for displacement to/from the installation/recovery section, said platform means being formed and arranged for supporting thereon the cross-members of the support structure of the invention, as successive segments of the cassette are extended/contracted during advance/retreat of the cassette along the installation/recovery section.

In yet another aspect the present invention provides an endless conveyor belt support system comprising a support structure of the invention and a setting device suitable for use in holding said support structure in its longitudinally contracted form and longitudinal extension and contraction of said support structure, said setting device comprising a carriage means formed and arrange for carrying said support structure in its longitudinally contracted condition, and progressively deploying and extending said support structure behind the carriage means as said carriage means is advanced, said carriage means being provided with a retractor means formed and arranged for engagement with successive portions of the support structure and drawing them onto said carriage means for longitudinal contraction of said support structure.

In a still further aspect the present invention provides an endless conveyor belt support system comprising a support structure of the invention and a setting device suitable for use in insertion and/or removal of a conveyor belt support cassette comprising a length of said support structure in/from an endless conveyor belt system, said setting device comprising a carriage means having:

a cassette receiving and/or ejecting section; and a cassette installation and/or recovery section, said carriage means being formed and arranged for supporting, in use, a said cassette substantially between the upper and lower belt runs, said receiving and/or ejecting section having laterally displacable cassette transfer means formed and arranged for transferring a cassette in a longitudinally contracted form between a setting device loading/unloading position adjacent one side of the setting device, and a position between the upper and lower belt runs, and bringing the cassette to/from a position for displacement to/from the installation/recovery section, said carriage means being formed and arranged for supporting thereon the support structure, as successive segments of the cassette are extended/contracted during advance/retreat of the cassette along the installation/recovery section.

Preferably the carriage means is provided with a retractor means formed and arranged for engagement with successive portions of the support structure and drawing them onto said carriage means for longitudinal contraction of said support structure.

Further preferred features and advantages of the invention will appear from the following detailed description given by way of example of some preferred embodiments illustrated with reference to the accompanying drawings in which:

FIG. 4 is a partial perspective view of the setting device of FIG. 1;

FIG. 5 is a detail view corresponding to that of FIG. 3 of a modified support structure embodiment;

FIG. 6 is a detail perspective view of another support structure similar to that of FIG. 3 but with a modified roller mounting disposition;

FIG. 7 is a side elevation generally corresponding to that of FIG. 1 of another embodiment of the invention suitable for cyclic operation;

Figure 1:
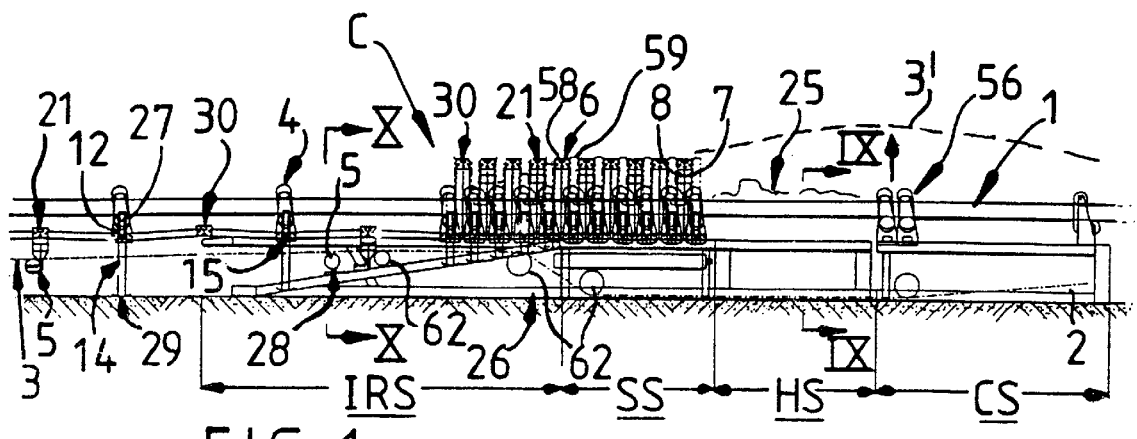
FIG. 1 is a side elevation of part of an endless conveyor belt system with a partly extended support structure of the invention within a setting device therefor.

FIG. 1 shows part of an endless conveyor belt system C in which upper (carrying) 1 and lower (returns), 2 runs of an endless conveyor belt 3 are supported on respective rollers 4, 5. A discrete belt support structure in the form of a longitudinally extendable "cassette" 6 comprises a plurality of pivotally interconnected support members 7, 8 at each side 9 and 10 of the conveyor belt 3, rigidly connected to each other by cross-members 11.

In more detail (see also FIG. 3) the support members include upright members 12 forming the opposite sides of generally H-shaped supports 13, whose cross-pieces are constituted by the cross-members 11. The lower, ground engaging, portions 14 of the uprights 12 are telescopically retractable into the upper portions 15 thereof. In the region of their junction 16 with the cross-members 11, the upright members 12 are pivotally connected 17 to the outer ends of generally (inverted) V-shaped arrangements of pairs of link support members 18 pivotally interconnected 19 via a depending roller support member 20 or a small connecting piece 30 each provided with respective abutment portions 20a, 30a, for limiting opening out of the link support members 18 at the apex 21 of the V-shape to a shallow V-shape as generally indicated in the drawings. The roller support member 20 is generally hook-shaped at its base 22 for detachably receiving and supporting thereon a lower return belt run support roller means in the form of a suspended idler roller set 23.

The H-shaped supports 13 mount upper carrying belt run support roller means in the form of transom type idler roller sets 24 formed and arranged for supporting the upper conveying run 1 of the belt 3 in a troughed configuration for helping to contain material 25 being carried on the belt 3.

Figure 2:
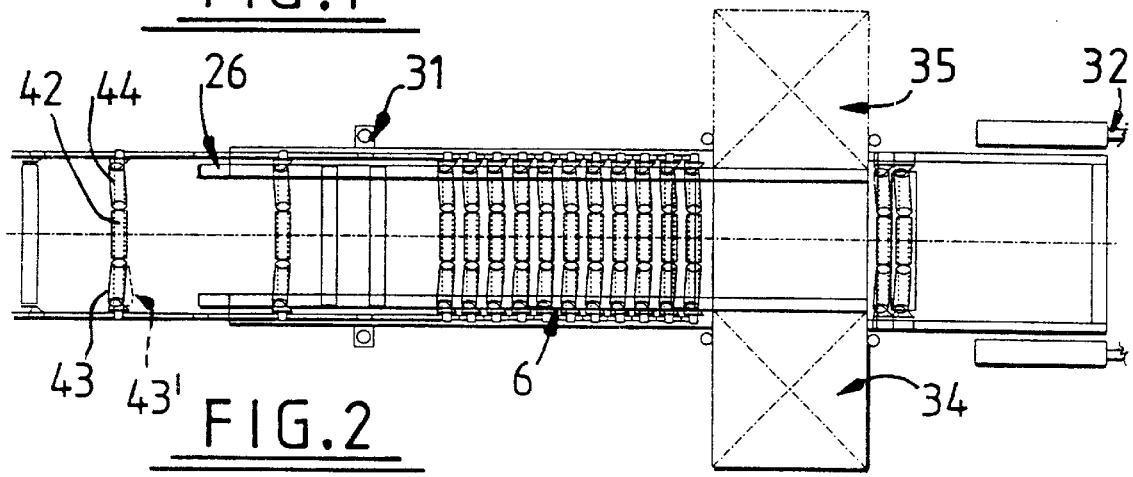
FIG. 2 is a plan view of the support structure of FIG. 1.

As shown in FIG. 2 the cassette 6 is initially stored in a longitudinally contracted form on a setting device 26 which is used to locate the cassette 6 in the conveyor belt installation and then insert it thereinto and remove it therefrom. In the contracted form of the cassette 6, the lower portions 14 of the upright support members 12 are retracted into the upper portions 15 and the connecting V-shaped link member arrangements 7 closed-up together in generally concertina-like manner, so that the cassette 6 has a restricted length and height whereby insertion thereof between the upper and lower runs 1, 2 of the belt 3 from a position 34 or 35 (FIG. 2) alongside the belt 3 is facilitated. Once the cassette 6, still supported by the setting device 26, has been inserted between the upper and lower runs 1, 2 of the belt 3, which may be temporarily diverted away from each other to increase the separation therebetween, the cassette 6 may begin to be extended. Initially a first upright support member at one end of the cassette 6, is pulled out within the setting device 26 allowing the lower portion 14 automatically to drop down from the upper portion 15 to bring the upright 12 into its fully extended condition. Locking pins 27, preferably automatically engagable, are provided to retain the lower portion 14 fully extended. At the same time the V-shaped support member arrangement 18,20/30 connected thereto begins to open out lowering the hook-shaped idler roller support 20 which then automatically collects a return belt run support roller 23 from a roller store 28. When this support member segment 18, 20/30 of the cassette 6 is fully opened out the next upright 12 is pulled out within the setting device 26 and extended and the process repeated until the whole cassette (and any subsequent cassettes required to suit the desired conveyor length requirement has been fully deployed along the floor the feet 29 of the extended upright support members 12 resting on said floor 36. Removal of a cassette in a retreat mining system is generally a reversal of the abovedescribed process with the added feature that within the V shaped support member arrangement 18, 20/30 is a latch device 33 which automatically locks the unfolded V shaped support member arrangement in its deployed open position requires to be unlatched either manually or by interengaging cam means or the like.

In the retreating or retracting mode, vertical 31 and horizontal 32 steering jacks (see FIG. 2) are provided to ensure correct positioning of the setting device 26 adjacent one end of the deployed belt supporting structure prior for collection and refolding thereof back into its concertina-like form 6.

To assist the satisfactory operation of the conveyor belt 3 adjustment mechanisms 36, 37 are provided on the upper and lower belt supporting roller assemblies 4, 5 respectively for the control and alignment of the conveyor belt 1, 2 by a single operator stationed at one side of the conveyor C which is normally the travelling or access side.

In more detail the adjustment mechanism 36 provided on the upper belt supporting roller assembly 4 is in the form of a single slot means 38 extending generally parallel to the conveying direction, through which is received a securing bolt 39 or the like in generally known manner. The slot means 38 is provided on a bracket means 40 on the upper end 41 of the vertical support member 12 so that adjustment of the outer end 42 of the proximal one 43 only of the three rollers 42, 43, 44 extending across the width of the upper belt-run 3 to support it, forwards or backwards, can be made thereby varying the angle of inclination of the proximal roller 43 relative to the belt and to the other two rollers 42, 44. Surprisingly it has been found that this adjustment alone is sufficient to correct any mis-alignment of the belt without at the same time subjecting the belt to any significant additional stress. An example such an adjustment is shown in FIG. 2 at 43'. Conveniently the adjustment mechanism 36 is provided at both sides of the support structure to allow use thereof at whichever side happens to be accessible in any given situation.

The setting device 26 will now be described in more detail with reference to FIG. 4 in conjunction with FIGS. 1 and 2. In general the setting device 26 comprises a large sled structure 45 with a connecting section CS used to coupled the setting device 26 to a return end station or other apparatus at the advancing and/or retreating end of the conveyor C (not shown); a handling section HS where contracted cassettes 6 are inserted into or removed from the conveyor system C; a storage section SS for holding one or more contracted cassettes 6; and an installation and/or recovery section IRS.

In more detail the sled structure comprises parallel spaced apart elongate members 46 forming a platform 47 on which the cross-members 11 of the 'H'-shaped supports 13 rest, the elongate members 46 being supported by legs 48 on base runners 49 provided with self-cleaning surfaces 50 inclined for shedding any material falling thereonto. The handling section HS is provided with a tray 51 slidable laterally outwardly of the setting device 26 to a ground level loading/unloading position alongside the latter as shown in FIG. 2 at 52, 53 and in chain-line in FIG. 4. The tray 51 includes handling section portions 46a of the platform members 46 so that when the tray 51 is lowered to ground level and slid outwardly to its loading/unloading position shown in dashed outline, a cassette 6 is loaded onto these platform member portions 46a which join up to the rest of the platform members when the tray is drawn back into the setting device 26 and raised (see below). In use a cassette 6 is brought up to the tray 51 in its loading/unloading position and placed thereon. The tray 51 is then pulled back into the setting device 26 by a tray deployment piston-cylinder means 54 and next raised up to the level of the platform 46 by tray elevating piston-cylinder means 55. As shown in FIG. 1 the coupling section CS of the setting device is provided with a pair of upper belt run support rollers 56 which may be driven upwards by support roller elevating piston-cylinder means 57 to raise temporarily the upper belt run to an elevated position 3' where it passes over the handling section HS in order to facilitate the lateral movement of the cassette into and out of the setting device 26 within the handling section HS.

Once the cassette 6 has been raised up on the tray 51 it is advanced along the platform 47 into the storage section SS to be coupled to a previously loaded cassette 6 by making pivotal connections 17 between link support members 18 at the trailing end 58 of the previously loaded cassette 6 and upright support members 12 at the leading end 59 of the newly loaded cassette 6, using a cassette shifting piston-cylinder means 60 provided with a reversible cassette engagement head 61. As shown in FIGS. 1 and 4 the lower belt run 2 is diverted downwardly close along the ground beneath the tray 51 and cassette handling piston-cylinder means etc. by means of guide rollers 62.

As shown in FIG. 4, the setting device 26 also includes at each side an elongate support track 63 immediately outwardly of the platform members 46, for engaging the feet 29 of the upright support members 12. In the handling and storage sections HS, SS the tracks 63 are slightly below the upper surfaces 64 of the platform members 46 so that the inside edges 65 of the feet 29 run alongside the outer edges 66 of the platform members 46. In the installation and recovery section IRS, the tracks 63 are inclined downwardly 67 to distal end sections 68 which extend alongside the runners 49. Thus when an upright support 12 of a cassette 6 passes along the installation and recovery section IRS as the setting device 26 advances along the ground underneath (see FIG. 1), the lower portions 14 of the upright supports 12 are progressively lowered as they traverse the sloping portions 67 of the tracks 63, whilst the cross-members 11 supported by the platform members 46 are maintained at a constant height. This has the further advantage of avoiding he need for bodily lifting the belt and any material on it during contraction of the support structure. When the feet 29 reach the distal end sections 68 the lower portions 14 are fully extended and the catches 27 provided on the upper portions 15 engage to secure the lower portions 14 in their extended positions. The feet 29 then traverse the horizontal distal end sections 68 of the tracks 63 for a short distance to ensure that the link-support members 18 in a given portion of the cassette are fully opened out and "locked" into their open configurations ensuring stability of the roller support structure (e.g. against leaning over of the upright supports 12 etc.) before the given portion of the cassette is expelled onto the ground. (The link and upright supports 18, 12 are conveniently stabilised relative to each other by the provision of mutually engaging abutment surfaces 69 and retractable wedges 70).

The distal end portions 71 of the platform members 46 are also downwardly inclined to lower the now fully extended 'H'-shaped supports 13 onto the ground when they are expelled from the setting device 26. The tips 72 of these end portions 71 may be levelled out 73 for this purpose, but normally would be fully inclined for cassette collection (as used for example in retreat mining applications).

Figure 3:
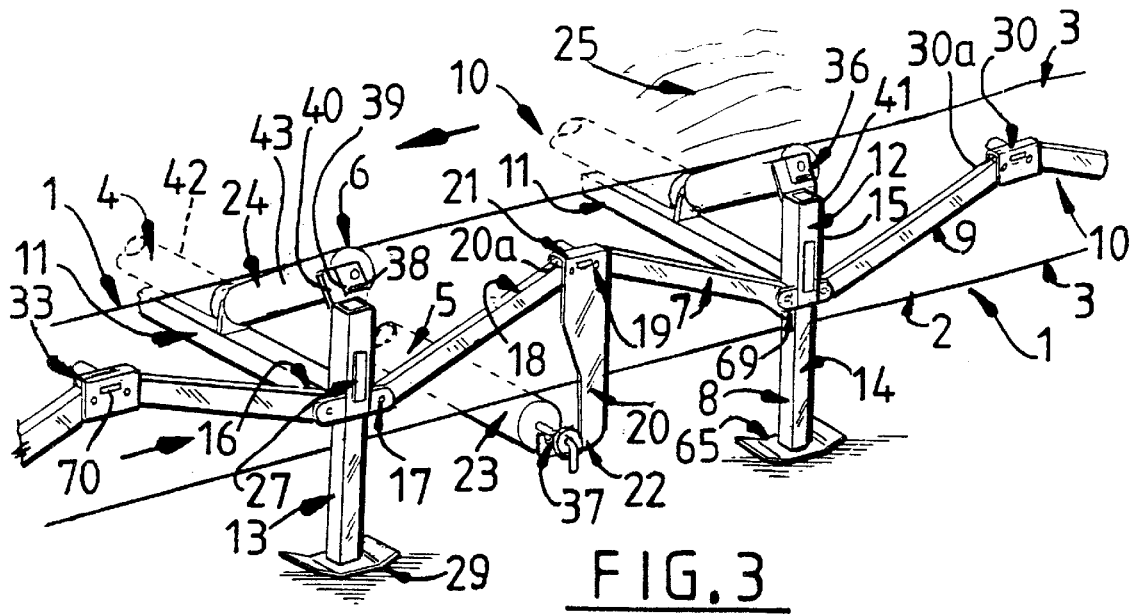
FIG. 3 is a detail perspective part view of the support structure of FIG. 1 in its deployed form.

Towards an outer end 74 the installation and recovery section IRS is provided with a return belt run support roller store 28 into which return belt support rollers 5 are manually inserted for automatic pick-up by the hook shaped base 22 of roller support members 20 (see FIG. 3).

The setting device 26 may of course include various conventional devices such as a return belt plough 75 for cleaning the lower belt run 2.

It will be appreciated that various modification may be made to the above described embodiment without departing from the scope of the present invention. Thus for example where the conveyor belt support structure does not require to support the conveyor belt off the ground, this being achieved by some other means such as wall mounted brackets 80 as shown in FIG. 5 or roof slinging (not shown), the upright supports 81 may be considerably shorter in the extended position of the cassette and thus do not necessarily need to be telescopically extendable. Also the novel type of tracking adjustment used on the upper belt run roller means 4 could be replaced by any other suitable adjustment means, such as, for example, the type used on the lower belt run roller means.

Yet another variation is shown in FIG. 6 wherein the upper belt run roller means 4 is mounted at an upper portion 82 of the lower belt roller support 20 connected to the V-shaped arrangements of like support member pairs 18 at the apex 21 thereof. Although this has the disadvantage of raising the height of upper belt run when the support structure is contracted this may be acceptable where headroom is not restricted. With this type of arrangement the extra loading on the link support members from both conveying and return belt runs will usually mean that it is not necessary to provide a latching/locking or wedging mechanism (70).

Figure 8A:
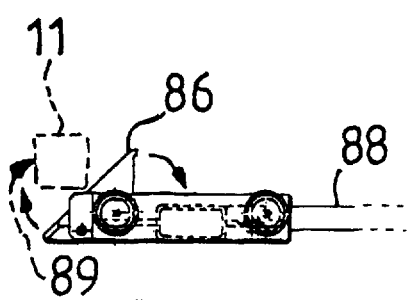
FIG. 8 is a detail view of the embodiment of FIG. 7 showing part of the retractor means thereof.
Figure 8B:
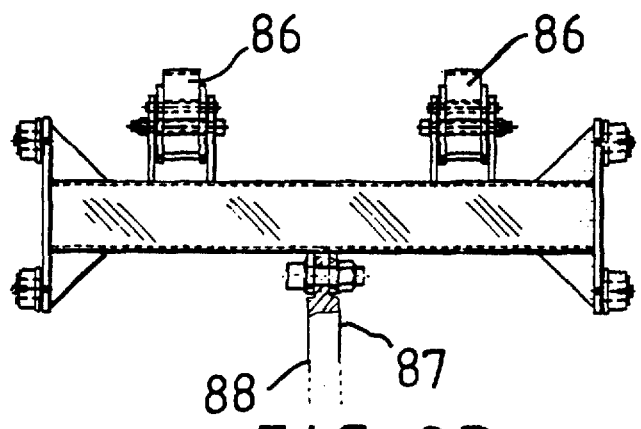

FIG. 7 shows another simplified embodiment suitable for use in a cyclic mode and like parts corresponding to those in the previous embodiments are indicated by like reference numbers. In this case the setting device 83 simply has an installation and recovery section IRS generally similar to that in FIG. 1 with a single length of support structure 84 secured thereto 84*a*. The setting device is however provided with a retractor means 85 in the form of a hydraulically operated piston and cylinder 85*a* with a deflectable hook means 86 at the free end 87 of the piston rod 88 (see also FIG. 8). The hook means 86 is arranged so that it is depressed by a cross-member 11 of the support structure when one piston rod is extended and then springs back up on the far side 89 of the cross-member 11 so that upon retraction of piston rod 88 the support structure is drawn onto the setting device 83. By repeating this process and reciprocating the piston and cylinder 85 substantially the whole of the support structure can be progressively drawn onto the setting device 83 and into the installation/recovery section IRS thereof.

The piston and cylinder 85 has a stroke generally equal to or slightly larger than the spacing between successive cross-members. In a typical arrangement with cross-members 11 between the vertical support members 13 (only) and the support structure having a repeating unit pitch of 1.39 m there is used a stroke of 1.40 m.

Such a retractor means is particular suitable for use in a cyclic mode of operation where the setting device is progressively advanced away from an existing conventional fixed or permanent support structure 96 until the support structure 84 has been fully extended. The support structure is then drawn back onto the setting device 83 until it is fully contracted, the permanent conveyor belt support structure 96 then being extended in conventional manner to catch up with the anchor portion 93 of the extensible support structure 84. The process can then be repeated with the setting device being progressively advanced again until the extensible support structure has been fully extended. Thus unlike in the first embodiment the setting device only moves forward and the use of the retractor means avoids the possibility of premature longitudinal collapse of the extended support structure remote from the setting device during retreat of the setting device as used in the previous embodiments for achieving contraction of the extensible support structure. Thus the need for any latching or locking means on the hinged support links may be avoided thereby allowing use of a substantially simpler form of pivotal hingeing interconnection 90 between the inclined support members 7, 9. Such a system can typically extend up to 25 m from a contracted length of 5.6 m.

In order to prevent the hook 86 of the retractor means 84 interfering with deployment of extensible support structure the setting device is provided with a deflector plate 91 at the extreme end of the piston rod's travel so that the hook 86 is deflected into a non-engaging position.

The distal end 92 of the extensible support structure is provided with an anchor portion 93 in the form of a more or less heavy sled body with ground engaging runners 94 which resist displacement of the anchor portion 93 as the setting device 83 progressively advances deploying the extensible structure behind it. If desired the anchor portion 93 may also be secured to the free end 95 of the permanent or fixed conventional support structure 96 but this is not essential.

The anchor portion 93 is also provided with an overbridge 97 to provide safe access to the far side of the conveyor system though it will be appreciated that one advantage of preferred forms of the invention is the substantially minimized access required to the far side.

As discussed hereinbefore the use of a retractor means allows a significantly simpler form of hinge construction 90 between the two "inclined" link members 7,9 without any special latching or locking means for securing them in their fully "opened-out" disposition and with only a single pivot instead of two as before which gives increased stability during extension and contraction.

Although as noted hereinbelow the use of detachable bottom rollers reduces the weight carried by the platform support members 46 it will be apprecited that it is not essential for the bottom rollers to be detachable especially where external platform support members are used for engaging outwardly projecting lugs on the support members of the support structure.

Figure 9:
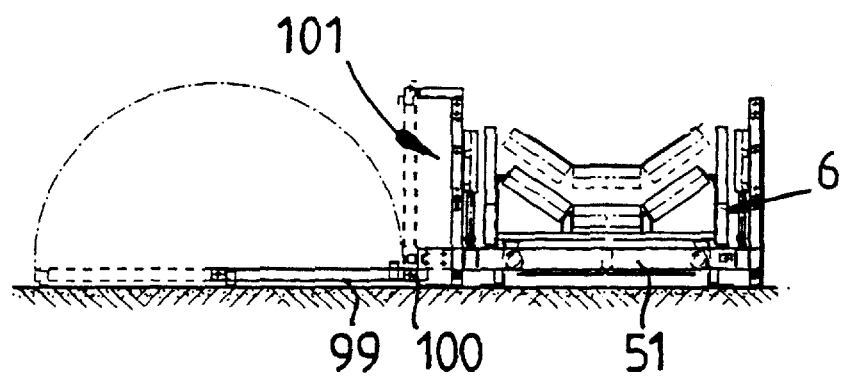
FIGS. 9 and 10 are transverse sectional elevations of an embodiment similar to that of FIG. 1.

FIG. 9 is a cross-section through the handling section HS of a system similar to that of FIG. 1. In this case a two-section folding track 99 is hingedly mounted 100 at the side 101 of the handling section HS for supporting the movable tray 51 which is used to carry a cassette 6 between an outboard loading/unloading position 34 (see FIG. 2) to the side of the setting device and an inboard insertion position. As shown in FIG. 9 once the cassette 6 has been brought inboard of the setting device it is raised on the tray 51 to the level of the storage section SS as shown in dashed outline.

Figure 10:
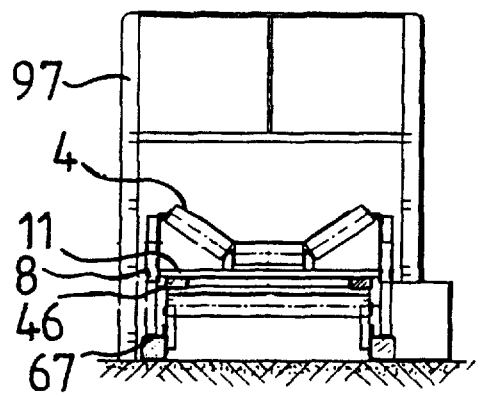

FIG. 10 is a cross section through the installation and recovery section IRS and shows the cross-members 11 of the support structure being supported on the cantilevered forward ends 46b of the platform support members 46 (see also FIG. 4) as well as an overbridge 97 similar to that in FIG. 7. By using detachable bottom rollers the weight of the contracted support structure on the cantilevered forward ends 46b of the platform support members is reduced. Nevertheless it will be appreciated that the bottom rollers could also be more permanently secured.

Further advantages of the invention that may be mentioned are the opportunity for improved safety as a result of the reduced requirement for manual erection and dismantling of conveyor belt support structure, and increased speed for extension and contraction of endless conveyor belt systems leading to reduced, and in some cases substantially eliminated, down-time.

I claim:

1. An endless conveyor belt support structure which is longitudinally extendable between an extended condition for supporting the endless conveyor belt, and a contracted condition, which support structure comprises a plurality of pivotally interconnected support members at opposite sides of the support structure, at least some of said support members being substantially rigidly interconnected by crossmembers to corresponding support members at the opposite side of the support structure, at least some of said support members mounting upper belt run support roller means at an upper edge portion of the support structure and at least some of said support members mounting lower belt run support roller means, said support members being interconnected so as provide for longitudinal extension and contraction of said sides of the support structure in generally concertina-like manner, characterised in that said support structure comprises a plurality of generally vertically extending support members interconnected by generally V-shape arrangements of pivotally connected pairs of link support members in which the V-shape opens out or closes up for extension or contraction of the support structure.

2. A structure according to claim 1 wherein said generally vertically extending support members are telescopically extensible from a contracted form in the longitudinally contracted condition of the structure to an extended form in the longitudinally extended condition of the structure.

3. An endless conveyor belt support structure which is longitudinally extendable between an extended condition for supporting the endless conveyor belt, and a contracted condition for insertion into and removal from an endless conveyor belt installation, which support structure comprises a plurality of pivotally interconnected support members at opposite sides of the support structure, at least some of said support members being substantially rigidly interconnected by crossmembers to corresponding support members at the opposite side of the support structure at an upper edge portion of the support structure, at least some of said support members mounting upper belt run support roller means at an upper edge portion of the support structure and at least some of said support members mounting lower belt run support roller means, said support members being interconnected so as provide for longitudinal extension and contraction of said sides of the support structure in generally concertina-like manner, at least some of said support members being longitudinally extendable between a contracted form in the longitudinally contracted condition of the support structure, and an extended form in the longitudinally extended condition, so that the overall height of the support structure can be reduced in its longitudinally contracted form.

4. A structure according to claim 1 wherein at least said upper belt run support roller means are mounted on said generally vertically extending support members.

5. A structure according to claim 1 wherein said lower belt run support rollers means are detachably mounted on the support members whereby insertion and removal of the support structure into and from a conveyor belt installation may be effected substantially without dismantling of the conveyor belt or the support structure apart from detaching and replacement of said lower belt run support roller means.

6. A structure according to claim 1 wherein is used an inverted V-shaped arrangement of link support members.

7. A structure according to claim 1 wherein said link support members are provided with stop means formed and arranged for restricting maximum opening of the V-shape to an angle of from 140° to 179°.

8. A structure according to claim 7 wherein said opening is restricted to an angle of from 150° to 178°.

9. A structure according to claim 1 wherein said support members are provided with latch means formed and arranged for releasably securing said link support members in an opened out arrangement in the longitudinally extended condition of the support structure for preventing closing up of said link members during longitudinal contraction of the support structure, until said latch means have been unlatched.

10. An endless conveyor belt support system comprising a support structure according to claim 1 and a setting device suitable for use in holding said support structure in its longitudinally contracted form and longitudinal extension and contraction of said support structure, said setting device comprising a carriage means formed and arrange for carrying said support structure in its longitudinally contracted condition, and progressively deploying and extending said support structure behind the carriage means as said carriage means is advanced, said carriage means being provided with a retractor means formed and arranged for engagement with successive portions of the support structure and drawing them onto said carriage means for longitudinal contraction of said support structure.

11. An endless conveyor belt support system comprising a support structure according to claim 1 and a setting device suitable for use in insertion and/or removal of a conveyor belt support cassette comprising a length of said support structure in/from an endless conveyor belt system, said setting device comprising a carriage means having:

a cassette receiving and/or ejecting section; and a cassette installation and/or recovery section, said carriage means being formed and arranged for supporting, in use, a said cassette substantially between the upper and lower belt runs, said receiving and/or ejecting section having laterally displacable cassette transfer means formed and arranged for transferring a cassette in a longitudinally contracted form between a setting device loading/unloading position adjacent one side of the setting device, and a position between the upper and lower belt runs, and bringing the cassette to/from a position for displacement to/from the installation/recovery section, said carriage means being formed and arranged for supporting thereon the support structure, as successive segments of the cassette are extended/contracted during advance/retreat of the cassette along the installation/recovery section.

12. A system according to claim 11 wherein said carriage means is provided with a retractor means formed and arranged for engagement with successive portions of the support structure and drawing them onto said carriage means for longitudinal contraction of said support structure.

13. A system according to claim 10 wherein said retractor means is of reciprocating action type.

14. A system according to claim 10 wherein said carriage means is provided with a bottom roller collection station and said support structure is provided with bottom roller mounting means formed and arranged for engaging and picking up bottom rollers as said support structure is deployed from the advancing carriage means.

15. A system according to claim 10 wherein said bottom roller collection station is formed and arranged for engaging and dismounting of said bottom rollers from said bottom roller mounting means as said support structure is longitudinally contracted onto said carriage means.

16. A system according to claim 10 wherein said carriage means is formed and arranged for supporting thereon the cross-members of the support structure.

17. A system according to claim 10, wherein a distal end of said support structure is provided with an anchor portion including a heavy body with ground engaging means formed and arranged for resisting displacement of aid anchor portion longitudinally of the support structure.

* * * * *

UNITED STATES PATENT AND TRADEMARK OFFICE
CERTIFICATE OF CORRECTION

PATENT NO. : 5,850,903

DATED : December 22, 1998

INVENTOR(S) : Walters

It is certified that error appears in the above-identified patent and that said Letters Patent is hereby corrected as shown below: On the title page item [56]

In the References Cited, FOREIGN PATENT DOCUMENTS, line 1, "11/1992" should read --5/1993--.

Column 10, line 20, after "as" insert --to--; line 61, "rollers" should read --roller--; line 67, after "wherein" insert --the support structure--; line 67, cancel "used".

Column 11, line 20, "arrange" should read --arranged--.

Column 12, line 37, "aid" should read --said--.

Signed and Sealed this

Eighth Day of June, 1999

*Attest:*

Q. TODD DICKINSON

*Attesting Officer*   Acting Commissioner of Patents and Trademarks